US008654494B2

(12) United States Patent
Larsen et al.

(10) Patent No.: US 8,654,494 B2
(45) Date of Patent: Feb. 18, 2014

(54) SYSTEMS AND METHODS FOR LIMITING VOLTAGE ON AN AUXILIARY BUS

(75) Inventors: Einar Vaughn Larsen, Charlton, NY (US); John Leo Bollenbecker, Albany, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/448,475

(22) Filed: Apr. 17, 2012

(65) Prior Publication Data

US 2013/0270916 A1 Oct. 17, 2013

(51) Int. Cl.
*H02H 3/22* (2006.01)
(52) U.S. Cl.
USPC ............................... 361/91.1; 361/111
(58) Field of Classification Search
USPC .......................... 361/91, 91.1, 111
See application file for complete search history.

(56) References Cited

U.S. PATENT DOCUMENTS

| 4,843,533 | A | * | 6/1989 | Roof et al. ................... 363/55 |
| 6,081,104 | A | * | 6/2000 | Kern ............................ 323/268 |
| 7,095,128 | B2 | * | 8/2006 | Canini et al. ................. 290/44 |
| 2004/0222642 | A1 | * | 11/2004 | Siebenthaler et al. ........ 290/44 |
| 2006/0238940 | A1 | * | 10/2006 | Komulainen et al. ........ 361/91.1 |
| 2011/0210553 | A1 | * | 9/2011 | Engelhardt et al. .......... 290/44 |

OTHER PUBLICATIONS

Utility Systems Technologies, Inc., The Sure Volt Schematic, 2007. http://www.ustpower.com/Products/SureVolt.aspx.

* cited by examiner

*Primary Examiner* — Danny Nguyen
(74) *Attorney, Agent, or Firm* — Dority & Manning, P.A.

(57) ABSTRACT

Systems and methods for limiting voltage on an auxiliary bus are described. The voltage-limited auxiliary bus may be comprised of a DC auxiliary bus comprised of a positive conductor and a negative conductor; a chopper, wherein the chopper is normally in a non-conducting state; a resistor in series with the chopper, wherein the chopper and the resistor are connected between the positive conductor and the negative conductor of the DC auxiliary bus; and a chopper control, wherein an overvoltage on the DC auxiliary bus causes the chopper control to cause the chopper to begin conducting and the conducting limits the voltage on the DC auxiliary bus and dissipates energy from the overvoltage.

17 Claims, 3 Drawing Sheets

SYSTEMS AND METHODS FOR LIMITING VOLTAGE ON AN AUXILIARY BUS

FIELD OF THE INVENTION

The present subject matter relates generally to power generation and more particularly, to a system and methods for limiting overvoltage conditions on an auxiliary bus of a power generation facility.

BACKGROUND OF THE INVENTION

Power generation facilities such as wind power plants comprised of one or more wind-turbine generators, gas-turbine plants, steam-turbine plants and the like have auxiliary electrical loads such as pumps, motors, HVAC equipment, lighting, and other balance of plant (BOP) equipment that are supplied power from one or more auxiliary busses within the facility. These auxiliary busses can be alternating current (AC) electrical busses and direct current (DC) electrical busses where the AC is converted to DC and used to supply DC loads. In some instances, these busses experience overvoltage conditions that can be caused by, for example, sudden tripping of one or more of the generators at the power generation facility. Generally, these overvoltage conditions are short in duration (e.g., lasting 1 second or less), but if not mitigated, these overvoltages may damage the BOP equipment connected to the busses.

Accordingly, described herein are systems and methods of limiting voltage on auxiliary busses during an overvoltage event.

BRIEF DESCRIPTION OF THE INVENTION

Aspects and advantages of embodiments of the invention will be set forth in part in the following description, or may be obvious from the description, or may be learned through practice of the invention.

In one aspect, the present subject matter discloses a method for of limiting voltage on an auxiliary bus. The method may generally include measuring voltage on an auxiliary bus; determining whether the measured voltage meets or exceeds a threshold voltage; and limiting voltage on the auxiliary bus by causing a chopper to change to a conducting state in response to the measured voltage meeting or exceeding the threshold voltage, wherein said chopper is connected in series with a resistor between a positive and a negative conductor of the DC auxiliary bus and said DC auxiliary bus is provided electrical energy by a converter connected to the AC auxiliary bus, said AC auxiliary bus connected to an AC electrical source.

In another aspect, the present subject matter discloses a voltage-limited auxiliary bus. An embodiment of the voltage-limited auxiliary bus may be comprised of a DC auxiliary bus comprised of a positive conductor and a negative conductor; a chopper, wherein the chopper is normally in a non-conducting state; a resistor in series with the chopper, wherein the chopper and the resistor are connected between the positive conductor and the negative conductor of the DC auxiliary bus; and a control device for controlling a conducting state of the chopper, wherein the control device causes the chopper to begin conducting when an overvoltage is detected on the DC auxiliary bus and the conducting limits the voltage on the DC auxiliary bus and dissipates energy from the overvoltage.

In another aspect, the present subject matter discloses yet another embodiment of a voltage-limited auxiliary bus. The voltage-limited auxiliary bus may be comprised of an alternating current (AC) electrical source; a DC auxiliary bus comprised of a positive conductor and a negative conductor; a converter, wherein the converter is connected to the AC electrical source through an AC auxiliary bus and the converter is connected to the DC auxiliary bus and the converter converts AC electrical energy from the AC electrical source to DC electrical energy for the DC electrical bus; a chopper, wherein the chopper is normally in a non-conducting state; a resistor in series with the chopper, wherein the chopper and the resistor are connected between the positive conductor and the negative conductor of the DC auxiliary bus; a control device for controlling a conducting state of the chopper, wherein the control device causes the chopper to begin conducting when an overvoltage is detected on the DC auxiliary bus and the conducting limits the voltage on the DC auxiliary bus and at least a portion of the AC auxiliary bus and dissipates energy from the overvoltage; a capacitor, wherein the capacitor is connected between the positive conductor of the DC auxiliary bus and the negative conductor of the DC auxiliary bus and the capacitor filters high-frequency electrical components induced on the DC auxiliary bus by the chopper conducting and helps provide low voltage ride-through for the load when the chopper is not conducting; and one or more inductors connected between the AC auxiliary bus and the AC electrical source, wherein the one or more inductors limit current flow from the AC electrical source to the converter when the chopper is conducting.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
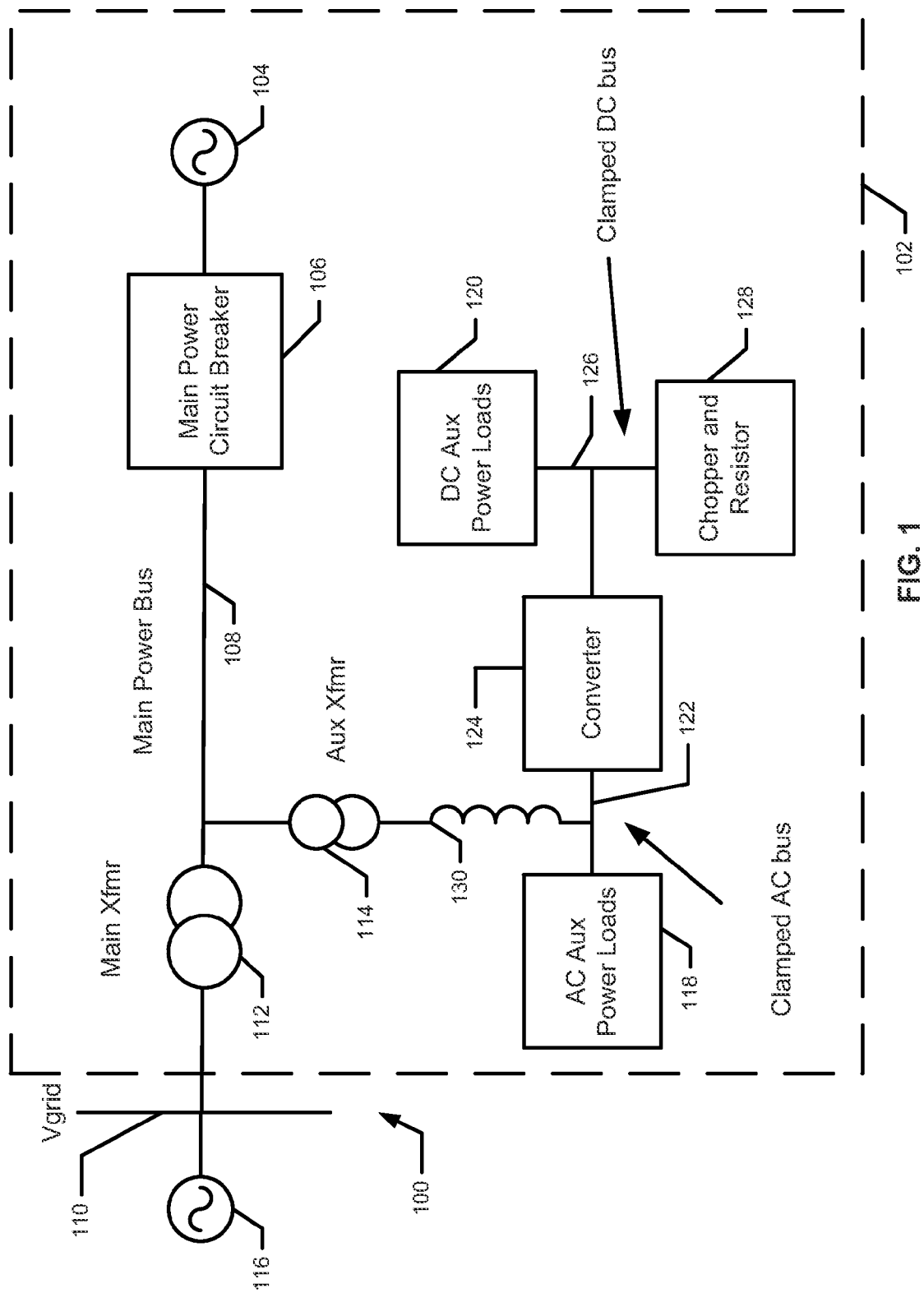
FIG. 1 illustrates a simplified single-line diagram of an exemplary electrical system including a power generation facility that may benefit from embodiments of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and methods for determining an overvoltage condition on an auxiliary bus of an electrical system and mitigating the overvoltage by use of a chopper circuit and resistor operated in parallel to loads on a DC auxiliary bus.

FIG. 1 is a simplified single-line diagram of an exemplary electrical system 100 including a power generation facility 102 that may benefit from embodiments of the present invention. Though illustrated as a single-line diagram, it is to be appreciated that and alternating-current (AC) portions of the electrical system 100 can be comprised of single-phase and poly-phase components such as two-phase, three-phase, and the like components and combinations thereof. This embodiment of an electrical system 100 is comprised of an electrical generator 104 that can generate power, both real and reactive. The generator 104 can be any device or systems for generating electrical power including, for example, one or more wind-turbine generators, one or more steam-turbine generators, one or more gas-turbine generators, one or more hydro-generators, one or more combustion-engine driven generators, one or more solar or other renewable energy sources (with conversion to AC, if necessary), and the like. Though shown as a single element, it is to be appreciated that the generator 104 can include other apparatus such as one or more AC to DC converters, one or more DC links, one or more DC to AC inverters, and the like. Power generated by the generator 104 is routed via a main power circuit breaker 106 to a main power bus 108. While the main power circuit breaker 106 is generally used to isolate the generator 104 in case of a fault on or at the generator 104, it can also be used to open the circuit between the main power bus 108 and the generator 104 when the generator 104 is offline so that the remainder of the facility 102 can be supplied power from the electric grid 110. Though shown as a single element, it is to be appreciated that the main power circuit breaker 106 can comprise any number of electrical devices including, for example, breakers, switchgear, motor control centers, synchronizing systems, and the like. The main power bus 108 transfers power generated by the generator 104 to a main transformer 112 and an auxiliary ("aux") transformer 114. Similarly, when the generator 104 is offline, the main power bus 108 can be used to distribute electrical power from the electric grid 110 to loads within the facility 102, including loads served by the aux transformer 114. In one non-limiting example, the main power bus 108 can be operated at a voltage rating of 690 volts (line to line) and have a rating of about 1500 to about 3000 kilowatts (KW).

Generally, the main transformer 112 steps up the voltage on the main power bus 108 to the level of the electric grid 110. However, the main transformer 106 may also step down the voltage from the electrical grid 110 for distribution in the facility 102 via the main power bus 108. Generally, the main transformer 112 is a poly-phase transformer. The electrical grid 110 can be comprised of transmission and distribution level components operated at various voltage levels as needed for distributing the generated electrical power to various loads. For example, the electrical grid 110 may be comprised of distribution-level components that are operated at distribution voltages that can range from approximately 2 kilovolts (KV) up to 34.5 KV (generally, these are voltages between phases of the distribution system, i.e., line-to-line (LL) voltages). Sub-transmission level and transmission level voltages can range from 35 KV and up. The electrical grid 110 can be comprised of a single circuit or a plurality of circuits. A circuit may be mere feet in length or several miles. The electrical grid 110 can serve a single load or numerous loads. The electrical grid 110 can be interconnected with numerous other electrical generators 116.

The aux transformer 114 steps down the voltage from the main power bus 108 to a level that can be used by auxiliary loads including AC auxiliary loads 118 and direct current (DC) auxiliary loads 120 (once the AC is converted to DC). For example, the auxiliary transformer 118 may step down the main power bus voltage to 480 volts (LL) where it is distributed to various AC auxiliary loads 118 via an AC auxiliary bus 122. The AC auxiliary bus 122 can also provide power to an AC to DC converter 124 that converts the AC power to DC power for distribution on a DC auxiliary bus 126. Typically, the wires, cables, buswork and the like that connect to the auxiliary transformer 118 on the load (e.g., low-voltage) side comprise the auxiliary bus and include the AC auxiliary bus 122 and the DC auxiliary bus 126. Typical, though non-limiting, ratings for the auxiliary transformer 114 are about 100 to about 150 kilovolt amperes (KVA).

In one aspect, voltage on the DC auxiliary bus 126 and at least a portion of the AC auxiliary bus 122 can be limited in the event of an overvoltage. Overvoltages caused by various disturbances in an electrical system can spike as high as about 1.5 to about 1.6 times the normal voltage value of an electrical system. These events can damage electrical equipment if not controlled and mitigated. FIG. 1 illustrates a chopper and resistor circuit 128 on the DC auxiliary bus 126 that can limit overvoltage peaks on the DC auxiliary bus 126 and at least a portion of the AC auxiliary bus 122. In one aspect, one or more inductors 130 are placed between the source of AC electrical energy and the AC auxiliary bus 122 in order to limit current inrush to the converter 124 when the chopper and resistor circuit 128 is conducting.

Figure 2:
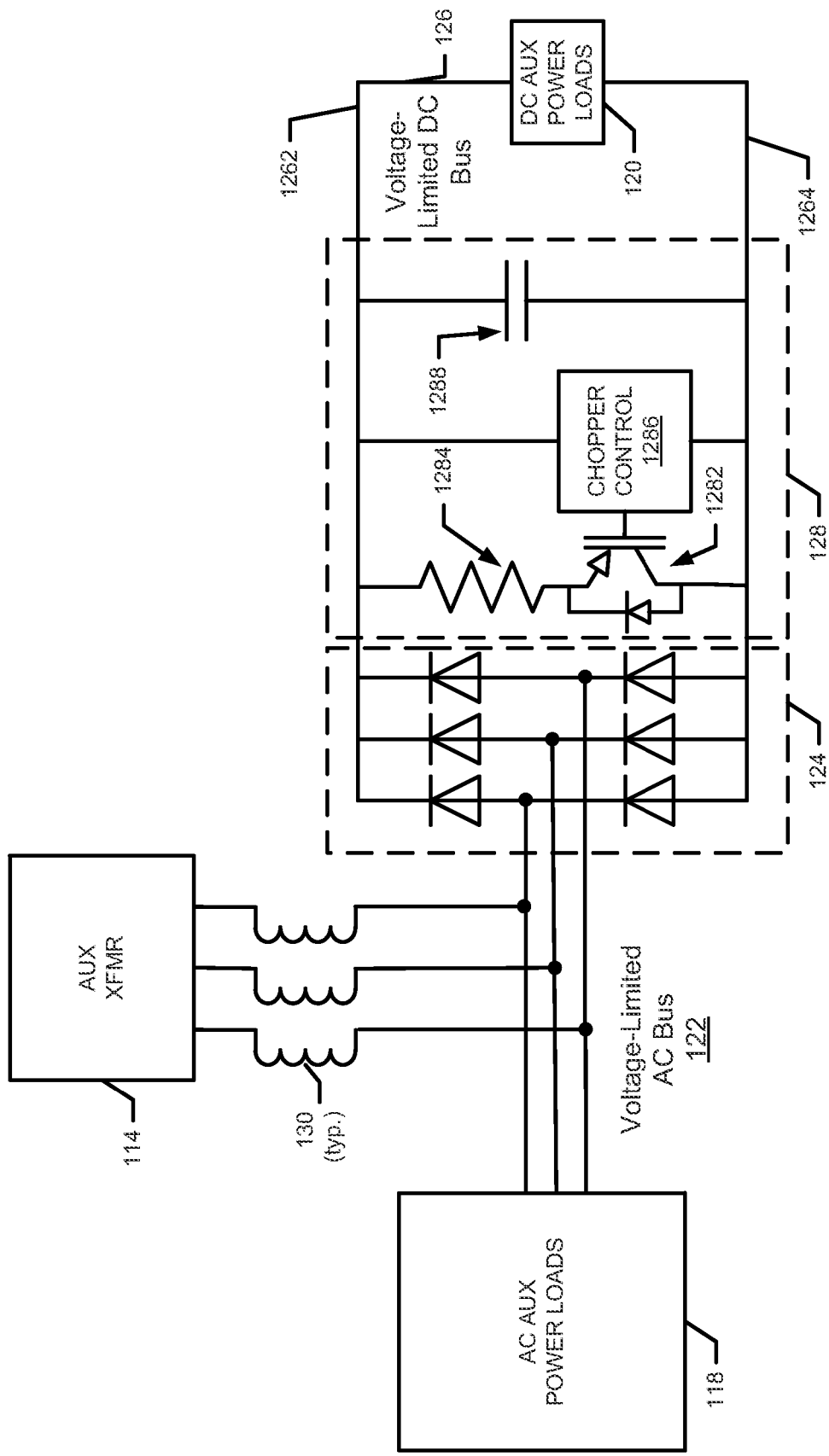
FIG. 2 is a three-line diagram of a portion of the electrical system shown in FIG. 1.

FIG. 2 is a three-line diagram of a portion of the electrical system 100 shown in FIG. 1. Though shown as a three-line diagram, it is to be appreciated that embodiments of the invention contemplate any number of electrical phases of aspects of the system 100, including single-phase, three-phase, and the like. As shown in FIG. 2, a voltage-limited auxiliary AC bus 122 and a voltage-limited auxiliary DC bus 126 are provided by use of the chopper and resistor circuit 128 on the DC bus 126. Generally, the voltage-limited auxiliary bus can be comprised of a DC auxiliary bus 126 comprised of a positive conductor 1262 and a negative conductor 1264. The conductors can be cables, rigid bus work, and the like. Further comprising the voltage-limited bus is a chopper 1282, wherein the chopper 1282 is normally in a non-conducting state. The chopper 1282 can be comprised one or more of a gate turn-off (GTO) thyristor, gate-commutated thyristor (GCT), insulated gate bipolar transistor (IGBT), MOSFET, combinations thereof, and the like. In one non-limiting example, when conducting the chopper 1282 may have a frequency of about 1000 Hz. A resistor 1284 is in series with the chopper 1282, wherein the chopper 1282 and the resistor 1284 are connected between the positive conductor 1262 and the negative conductor 1264 of the DC auxiliary bus 126. The resistor 1284 is sized so that energy is dissipated from the DC bus 126 and voltage limited on the bus 126 in the event of an overvoltage on the bus 126. For example, the resistor 1284 may have a rating approximately the same as the rating for the auxiliary transformer 114. Non-limiting examples of ratings for the resistor 1284 include 100 to 150 KW. The chopper 1282 is controlled by a control device for controlling the conducting state of the chopper 1282. Generally, the control device for controlling the conducting state of the chopper 1282 comprises a chopper control circuit 1286. Generally, an overvoltage condition on the DC auxiliary bus 126 detected by the chopper control 1286 to cause the chopper 1282 to begin conducting, wherein the conducting limits the voltage on the DC auxiliary bus 126 and dissipates energy from the overvoltage. In one aspect, the threshold at which the chopper control 1286 causes the chopper 1282 to begin conducting and the threshold at which the chopper control 1286 causes the chopper 1282 to stop conducting can be set. As a non-limiting example, the chopper control 1286 may be set to cause the chopper 1282 to begin conducting when a 10 percent or greater overvoltage is detected on the DC bus 126 and to stop conducting when the overvoltage (determined during conducting periods of the chopper 1282) drops below ten percent overvoltage. In one aspect, the chopper control 1286 can use the duration of the overvoltage as a factor to determine when to cause the chopper 1282 to begin conducting. As a non-limiting example, a five percent overvoltage may cause the chopper control 1286 to cause the chopper 1282 to begin conducting after 10 seconds, but a 25 percent overvoltage may cause the chopper control 1286 to cause the chopper 1282 to begin conducting after 0.5 seconds. In another embodiment, the chopper control 1286 can cause the chopper 1282 to begin conducting immediately when the detected voltage reaches or exceeds the threshold and remain conducting until the detected voltage drops below the voltage threshold. As shown in FIG. 2, the DC auxiliary power load 120 is in parallel with the chopper 1282 and resistor 1284 combination.

Further comprising the portion of the system 100 of FIG. 2 is a source of AC power. Generally, this can be the aux transformer 114 as supplied from the main power bus 108. In one aspect, the AC electrical source is a three-phase electrical source, though single-phase and other poly-phases sources are contemplated within the scope of embodiments of the present invention. In one aspect, the AC electrical source can be a 60 Hz. electrical source though other frequencies such as, for example, 50 Hz., are also contemplated within the scope of embodiments of the present invention. The source of AC power provides electrical energy to a converter 124 for converting the AC electrical power to DC electrical power. The converter 124 is connected to the AC electrical source through an AC auxiliary bus 122 and the converter 124 is connected to the DC auxiliary bus 126 and the converter 124 converts AC electrical energy from the AC electrical source to DC electrical energy for the DC electrical bus 126. While the combination of the chopper 1282 and resistor 1284 holds the DC voltage of the DC bus 126 at or below some predetermined threshold in the event of a high AC source voltage, the nature of the converter 124 forces the AC line to line voltage of the AC side of the converter 124 to be equal to the DC link voltage when there is current flowing in the AC side of the converter 124. Therefore, clamping the DC-side voltage on the DC bus 126 also clamps the AC-side line to line voltage on at least a portion of the voltage-limited AC bus 122. Though shown as a diode bridge, it is to be appreciated that the converter 124 can be any means for converting AC electrical energy to DC electrical energy including, for example, diodes, thyristors, and the like.

In one aspect, the portion of the system 100 of FIG. 2 can further comprises one or more inductors 130 connected between the AC auxiliary bus 122 and the AC electrical source. The one or more inductors 130 limit current flow from the AC electrical source to the converter 124 when the chopper 1282 is conducting. In one aspect, the one or more inductors 130 have a reactance at the rated frequency of the AC electrical source of about 10 percent or greater to about 30 percent or less of a reactance rating of the load on the AC bus 122. In one aspect, the chopper circuit 128 can further comprise a capacitor 1288 connected between the positive conductor 1262 of the DC auxiliary bus 126 and the negative conductor 1264 of the DC auxiliary bus. The capacitor 1288 can filter high-frequency electrical components induced on the DC auxiliary bus 126 by the chopper 1282 conducting and helps provide low voltage ride-through for the DC load 120 when the chopper 1282 is not conducting. In one aspect, the capacitor 1288 can have a rating such that DC ripple on the DC auxiliary bus 126 is at 5 percent or less when the chopper 1282 is conducting.

Figure 3:
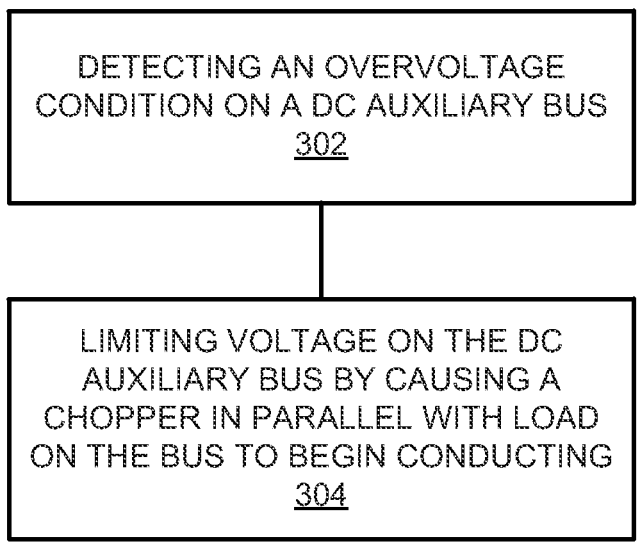
FIG. 3 is an exemplary flowchart illustrating an embodiment of a method of limiting voltage on an auxiliary bus.

FIG. 3 is an exemplary flowchart illustrating an embodiment of a method of limiting voltage on an auxiliary bus. At step 302, an overvoltage condition is detected on a direct current (DC) auxiliary bus. In one aspect, the DC auxiliary bus is comprised of a positive conductor and a negative conductor, a converter connected to an AC electrical source through an AC auxiliary bus and the converter is connected to the DC auxiliary bus and the converter converts AC electrical energy from the AC electrical source to DC electrical energy for the DC electrical bus, a chopper that is normally in a non-conducting state, a resistor in series with the chopper, wherein the chopper and the resistor are connected between the positive conductor and the negative conductor of the DC auxiliary bus, a load in parallel with the chopper and the resistor, a capacitor in parallel with the load, and a chopper control. At step 304, voltage is limited on the DC auxiliary bus and at least a portion of the AC auxiliary bus by causing the chopper to change to a conducting state in response to detecting the overvoltage condition, wherein the overvoltage on the DC auxiliary bus causes the chopper control to cause the chopper to begin conducting. In various aspects, the method can also include filtering the output of the chopper when the conductor is in the conducting state using the capacitor, wherein the capacitor filters high-frequency electrical components induced on the DC auxiliary bus by the chopper conducting and provides low voltage ride-through for the load when the chopper is not conducting; and limiting current flow from the AC electrical source to the converter when the chopper is conducting using one or more inductors connected between the AC auxiliary bus and the AC electrical source.

Figure 4:
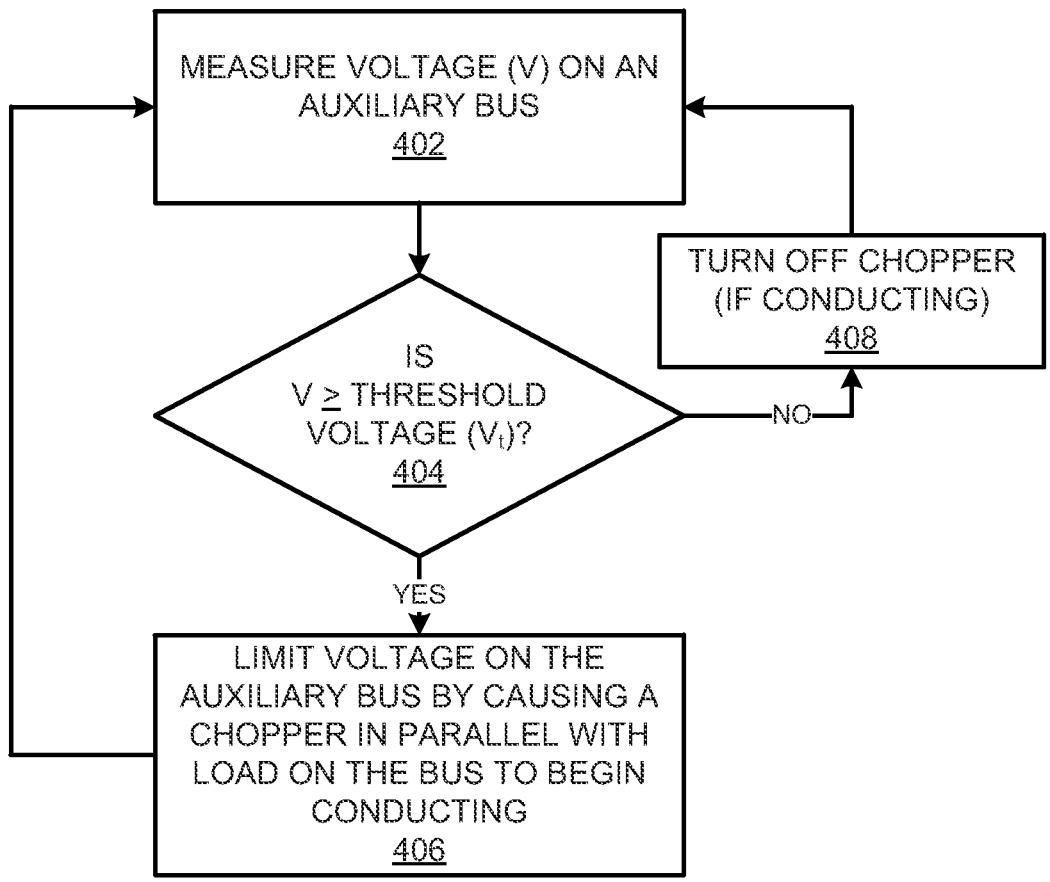
FIG. 4 is an exemplary flowchart illustrating an alternate embodiment of a method of limiting voltage on an auxiliary bus.

FIG. 4 is an exemplary flowchart illustrating an alternate embodiment of a method of limiting voltage on an auxiliary bus. At step 402, voltage (V) on an auxiliary bus is measured. This can be performed using any means now known or developed including, for example, potential transformers, current transformers and resistors, and the like. The auxiliary bus can be, for example, the AC bus 122 or the DC bus 126. At step 404, the measured voltage, V, is compared to a threshold voltage ($V_t$). $V_t$ can be any value as set for operation of the auxiliary bus. For example, $V_t$ can be set as 10 percent over nominal voltage, 15 percent over nominal voltage, and the like. If, at step 404, V is greater than or equal to $V_t$, then the process goes to step 406. At step 406, voltage is limited on the auxiliary bus by a chopper control causing a chopper to change to a conducting state in response to detecting V greater than or equal to $V_t$. Generally, the chopper is located between a positive and negative conductor of a DC auxiliary bus and is in a non-conducting state, a resistor is in series with the chopper, and a load is in parallel with the chopper and the resistor. In one aspect, a capacitor is in parallel with the load, wherein the capacitor filters high-frequency electrical components induced on the DC auxiliary bus by the chopper conducting and provides low voltage ride-through for the load when the chopper is not conducting. Once the chopper begins conducting at step 406, the process returns to step 402 where V is measured on the auxiliary bus. Returning to step 404, if V is not greater than or equal to $V_t$, the process goes to step 408 where, if the chopper was conducting, it is turned off using the chopper control, and the process returns to step 402 where V is measured on the auxiliary bus.

It is to be appreciated that the processes of FIGS. 3 and 4 can be implemented by an intelligent device associated with chopper control 1286 including for example a processor, a microprocessor, a computer, a field-programmable gate-array (FPGA), a programmable logic controller (PLC), and the like that has been programmed or encoded with the logic to implement the described steps.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A voltage-limited auxiliary bus comprising:
   a DC auxiliary bus comprised of a positive conductor and a negative conductor;
   a chopper, wherein the chopper is normally in a non-conducting state;
   a resistor in series with the chopper, wherein the chopper and the resistor are connected between the positive conductor and the negative conductor of the DC auxiliary bus;
   an alternating current (AC) electrical source and a converter, the converter connected to the AC electrical source through an AC auxiliary bus, the converter connected to the DC auxiliary bus, the converter configured to convert AC electrical energy from the AC electrical source to DC electrical energy for the DC auxiliary bus; and
   a control device for controlling a conducting state of the chopper, wherein the control device causes the chopper to begin conducting when an overvoltage is detected on the DC auxiliary bus, wherein said conducting limits the voltage on the DC auxiliary bus and at least a portion of the AC auxiliary bus and dissipates energy from the overvoltage;
   wherein the converter is configured to clamp an AC voltage on at least a portion of the AC auxiliary bus to a DC voltage on the DC auxiliary bus when a current is flowing on an AC side of the converter during the conducting of the chopper.

2. The voltage-limited auxiliary bus of claim 1, further comprising one or more inductors connected between the AC auxiliary bus and the AC electrical source, wherein the one or more inductors limit current flow from the AC electrical source to the converter when the chopper is conducting.

3. The voltage-limited auxiliary bus of claim 1, wherein the converter comprises a diode bridge.

4. The voltage-limited auxiliary bus of claim 2, wherein the one or more inductors have a reactance at a rated frequency of the AC electrical source of about 10 percent or greater to about 30 percent or less of a reactance rating of the load.

5. The voltage-limited auxiliary bus of claim 1, further comprising a capacitor, wherein the capacitors is connected between the positive conductor of the DC auxiliary bus and the negative conductor of the DC auxiliary bus and said capacitor filters high-frequency electrical components induced on the DC auxiliary bus by the chopper conducting and helps provide low voltage ride-through for the load when the chopper is not conducting.

6. The voltage-limited auxiliary bus of claim 5, wherein the capacitor has a rating such that DC ripple on the DC auxiliary bus is at 5 percent or less when the chopper is conducting.

7. The voltage-limited auxiliary bus of claim 1, wherein the chopper has a frequency of about 1000 Hz.

8. The voltage-limited auxiliary bus of claim 1, wherein the chopper comprises one or more of a gate turn-off (GTO) thyristor, gate-commutated thyristor (GCT), insulated gate bipolar transistor (IGBT), MOSFET or combinations thereof.

9. A voltage-limited auxiliary bus comprising:
   an alternating current (AC) electrical source;
   a DC auxiliary bus comprised of a positive conductor and a negative conductor;
   a converter, wherein the converter is connected to the AC electrical source through an AC auxiliary bus and the converter is connected to the DC auxiliary bus and the converter converts AC electrical energy from the AC electrical source to DC electrical energy for the DC auxiliary bus;
   a chopper, wherein the chopper is normally in a non-conducting state;
   a resistor in series with the chopper, wherein the chopper and the resistor are connected between the positive conductor and the negative conductor of the DC auxiliary bus;
   a control device for controlling a conducting state of the chopper, wherein the control device causes the chopper to begin conducting when an overvoltage is detected on the DC auxiliary bus, wherein said conducting limits the voltage on the DC auxiliary bus at least a portion of the AC auxiliary bus and dissipates energy from the overvoltage,
   a capacitor, wherein the capacitor is connected between the positive conductor of the DC auxiliary bus and the negative conductor of the DC auxiliary bus and wherein said capacitor filters high-frequency electrical components induced on the DC auxiliary bus by the chopper conducting and helps provide low voltage ride-through for the load when the chopper is not conducting; and one or more inductors connected between the AC auxiliary bus and the AC electrical source, wherein the one or more inductors limit current flow from the AC electrical source to the converter when the chopper is conducting, wherein the one or more inductors have a reactance at a rated frequency of the AC electrical source of about 10 percent or greater to about 30 percent or less of a reactance rating of the load.

10. The voltage-limited auxiliary bus of claim 9, wherein the converter comprises a diode bridge.

11. The voltage-limited auxiliary bus of claim 9, wherein the capacitor has a rating such that DC ripple on the DC auxiliary bus is at 5 percent or less when the chopper is conducting.

12. The voltage-limited auxiliary bus of claim 9, wherein the chopper has a frequency of about 1000 Hz.

13. The voltage-limited auxiliary bus of claim 9, wherein the chopper comprises one or more of a gate turn-off (GTO) thyristor, gate-commutated thyristor (GCT), insulated gate bipolar transistor (IGBT), MOSFET or combinations thereof.

14. A method of limiting voltage on an auxiliary bus, said auxiliary bus comprising an alternating current (AC) auxiliary bus and a direct current (DC) auxiliary bus, said method comprising:

measuring voltage on an auxiliary bus;

determining whether the measured voltage meets or exceeds a threshold voltage; and limiting voltage on the auxiliary bus by causing a chopper to change to a conducting state in response to the measured voltage meeting or exceeding the threshold voltage, wherein said chopper is connected in series with a resistor between a positive and a negative conductor of a DC auxiliary bus and said DC auxiliary bus is provided electrical energy by a converter connected to the AC auxiliary bus, said AC auxiliary bus connected to an AC electrical source;

limiting current flow from the AC electrical source to the converter when the chopper is conducting using one or more inductors connected between the AC auxiliary bus and the AC electrical source, wherein the one or more inductors have a reactance at a rated frequency of the AC electrical source of about 10 percent or greater to about 30 percent or less of a reactance rating of the load.

15. The method of claim 14, further comprising continuing to monitor the voltage on the auxiliary bus and causing the chopper to stop conducting when the measured voltage is less than the threshold voltage.

16. The method of claim 14, further comprising filtering the output of the chopper when the conductor is in the conducting state using a capacitor, wherein the capacitor filters high-frequency electrical components induced on the DC auxiliary bus by the chopper conducting and provides low voltage ride-through for a load connected to the DC auxiliary bus when the chopper is not conducting.

17. The method of claim 14, wherein measuring voltage on the auxiliary bus comprises measuring voltage on the DC auxiliary bus.

* * * * *